(12) United States Patent
Schrag et al.

(10) Patent No.: US 6,298,646 B1
(45) Date of Patent: Oct. 9, 2001

(54) SQUARE BALER WITH INFEED CUTTER

(75) Inventors: Thomas G. Schrag, Hesston; Kelly Booton, Lehigh, both of KS (US)

(73) Assignee: Hay & Forage Industries, Hesston, KS (US)

( * ) Notice: Subject to any disclaimer, the term of this patent is extended or adjusted under 35 U.S.C. 154(b) by 0 days.

(21) Appl. No.: 09/516,356

(22) Filed: Mar. 1, 2000

(51) Int. Cl.$^7$ .............................. A01F 15/04; A01F 29/00
(52) U.S. Cl. ................................................ 56/341; 100/88
(58) Field of Search .............................. 56/341, 438, 440, 56/443, 446, 455, 344, 10.2 R, 16.4 R; 100/88, 89, 179, 189, 240

(56) References Cited

U.S. PATENT DOCUMENTS

| | | |
|---|---|---|
| 4,135,444 | 1/1979 | White et al. . |
| 4,999,987 | 3/1991 | Eggenmueller . |
| 5,092,114 | 3/1992 | Eggenmueller . |
| 5,768,872 * | 6/1998 | Von Allworden ...................... 56/341 |
| 5,787,694 | 8/1998 | Tertilt et al. . |
| 5,819,517 | 10/1998 | Amanatidis et al. . |
| 5,833,533 | 11/1998 | Roberg . |
| 5,842,335 * | 12/1998 | Esau ........................................ 56/341 |
| 5,899,054 | 5/1999 | Hawles et al. . |

FOREIGN PATENT DOCUMENTS

| | | |
|---|---|---|
| 2444165 | 3/1976 | (DE) . |
| 2444166A | 3/1976 | (DE) . |
| 3034404A1 * | 5/1982 | (DE) .............................. A01D/90/04 |
| 3334045A1 | 4/1985 | (DE) . |
| 3442831A1 | 8/1985 | (DE) . |
| 3444609A1 | 6/1986 | (DE) . |
| 3640317A1 | 6/1988 | (DE) . |
| 4130720A1 | 4/1992 | (DE) . |
| 19619548A1 | 12/1997 | (DE) . |
| 19646316A1 | 5/1998 | (DE) . |
| 19517639A1 | 11/1998 | (DE) . |
| 0077474A1 | 9/1982 | (EP) . |
| WO 84/02253 * | 6/1984 | (EP) .............................. A01F/15/00 |
| 0167903B1 | 6/1985 | (EP) . |
| 0204967A1 | 5/1986 | (EP) . |
| 0205854A1 | 5/1986 | (EP) . |
| 0579594A1 | 7/1993 | (EP) . |
| 0689760A1 | 1/1996 | (EP) . |
| 2048114 | 3/1971 | (FR) . |

OTHER PUBLICATIONS

New Holland Big Balers Models D1010 and D1210 Aug. 1997.
Welger Big BAIers D4000/D 6000/D 6050 No Date.
Quadrant 1200 1200 RC (Claas) No Date.

* cited by examiner

Primary Examiner—Robert E. Pezzuto
(74) Attorney, Agent, or Firm—Hovey, Williams, Timmons & Collins (57) ABSTRACT

A baler for making rectangular crop bales has a generally horizontally disposed fore-and-aft extending baling chamber. The pickup of the baler is disposed underneath the baling chamber in line with the path of travel of a reciprocating plunger in the overhead chamber. An in-line transfer duct leads generally upwardly and rearwardly from the pickup to the bottom of the chamber. An enclosed crop flow passage is defined from a point immediately behind the pickup to a point located at the opening in the bottom of the baling chamber and presents a forwardmost cutting zone, a packing zone behind the cutting zone, and an accumulating zone behind the packing zone. Cutter apparatus within the cutting zone reduces the crop materials into smaller pieces as they flow through the cutting zone, whereupon a separate packer takes the materials from the rear side of the cutter apparatus and packs them in a downstream direction toward the accumulating zone where they form into a charge. A stuffer operating through successive stuffing cycles then engages the accumulated and densified charge and sweeps it up into the baling chamber in timed relationship with the reciprocating plunger.

14 Claims, 7 Drawing Sheets

SQUARE BALER WITH INFEED CUTTER

TECHNICAL FIELD

The present invention relates to large, "square" hay balers that pick up windrowed crop materials from the field and pass the stream of materials through an onboard rotary cutter apparatus to reduce the materials into smaller pieces before charging the materials into the main baling chamber for compression into a finished bale.

BACKGROUND

Several different companies currently offer big square balers that utilize onboard cutter apparatus to reduce the inflowing crop into smaller pieces. Typically, such balers are "in-line", bottom-fed machines in which crop material is picked up directly underneath and slightly ahead of an overhead, fore-and-aft baling chamber containing a reciprocating plunger. Successive charges of material are delivered to the chamber through an underslung transfer duct. The cutter apparatus is located generally between the pickup and the transfer duct, and the rotor of the apparatus is used not only to reduce the materials into smaller pieces, but also to feed the materials so reduced into the duct for subsequent stuffing up into the baling chamber by stuffer mechanism operating through successive operating cycles.

A problem with conventional balers of this type resides in their reliance on the cutter rotor as a means of both cutting the materials into smaller pieces and then those materials into the transfer duct to form a charge before the charge is stuffed up into the baling chamber. While the rotor may perform its cutting operations well, it is not particularly suited for feeding and packing. Consequently, the charge may not be wellshaped before being loaded into the baling chamber, with the result that the overall shape of the finished bale may suffer.

SUMMARY OF THE INVENTION

Accordingly, one important object of the present invention is to provide improved bale shape in a baler that employs a cutter to cut the inflowing stream of crop materials into smaller pieces before charging the materials into the baling chamber. In a baler according to the present invention, a separate packer is utilized immediately behind a cutter rotor to take the crop materials from the rotor and pack them into one end of the transfer duct. The charge that is thus formed within the duct is subsequently stuffed up into the baling chamber to be compressed into a finished bale in the usual manner. The stuffer of the machine may be provided with control mechanism that temporarily suspends operation of the stuffer in the event the charge being formed in the duct has not reached a predetermined density by the start of the next successive stuffing cycle.

The packer is preferably in the nature of a plurality of packing forks arranged on a crankshaft in such a manner that the forks sweep down through the cut crop materials in staggered secession across the width of the duct. In the preferred form of the packer, teeth sweep down between laterally spaced blades of the cutter rotor as the blades are sweeping upwardly, thus effectively stripping the rotor and positively feeding the cut materials on into the duct in a long packing stroke leading from the cutter rotor to a location deep inside the duct.

DETAILED DESCRIPTION

Figure 1:
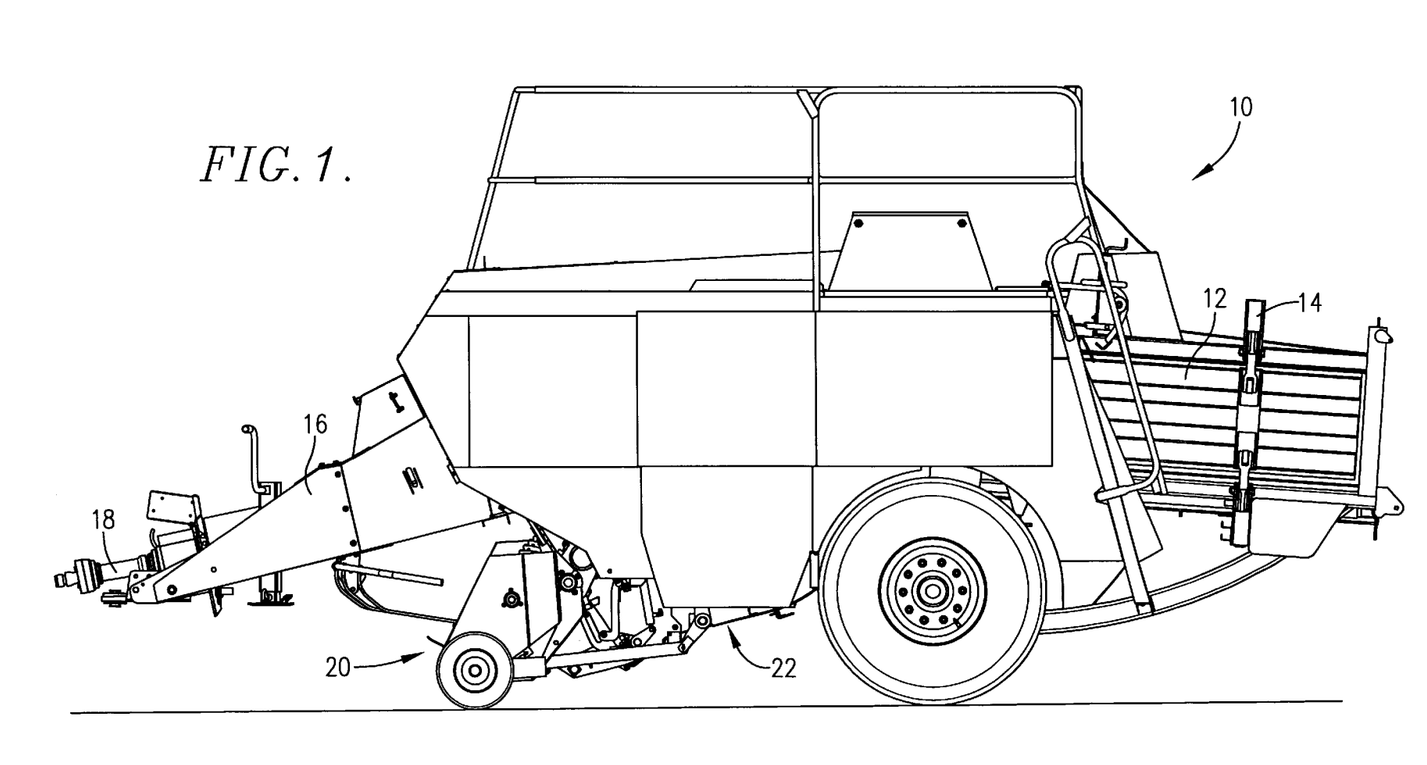
FIG. 1 is a side elevational view of a baler constructed in accordance with the principles of the present invention.

The baler 10 illustrated in FIG. 1 has a fore-and-aft extending baling chamber denoted generally by the numeral 12 within which bales of hay are prepared and forced incrementally out the back end of the chamber 12. In the illustrated embodiment, the baler 10 is an "extrusion" type baler in which the discharge orifice at the rear of the baler is of generally reduced dimensions relative to the upstream portion of the baling chamber such that the restrictive nature of the discharge orifice provides back pressure against which a reciprocating plunger within the baler can act to compress charges of hay into a bale. The dimensions of the discharge orifice and the squeeze pressure on the bales at that location are controlled by mechanism broadly denoted by the numeral 14 in FIG. 1. The baler is hitched to a towing vehicle by a fore-and-aft tongue 16, and power for operating the various components of the baler is supplied through a drive line 18 supported by the tongue 16.

The baler 10 is an "in-line" type of baler wherein crop is picked up directly beneath and slightly ahead of the baling chamber 12 and loaded up into the bottom of the chamber in a straight line path of travel as viewed from the top. Pursuant to this inline principle, the baler 10 has a pickup 20 positioned under the tongue 16 and in vertical registration with the baling chamber but considerably forwardly of the chamber. A duct 22 barely visible in FIG. 1 extends generally rearwardly and upwardly from behind the pickup 20 to an opening 24 (see FIG. 2) in the bottom of the baling chamber 12. The duct 22 serves as part of a passage through which crop materials travel from the pickup 20 to the baling chamber 12 during operation of the machine.

In many respects, the baler 10 is similar in construction and operation to the baler as disclosed in U.S. Pat. No. 4,135,444 owned by the assignee of the present invention. Accordingly, the '444 patent is hereby incorporated by reference into the present specification as may be necessary for a full and complete understanding of the present invention.

Figure 2:
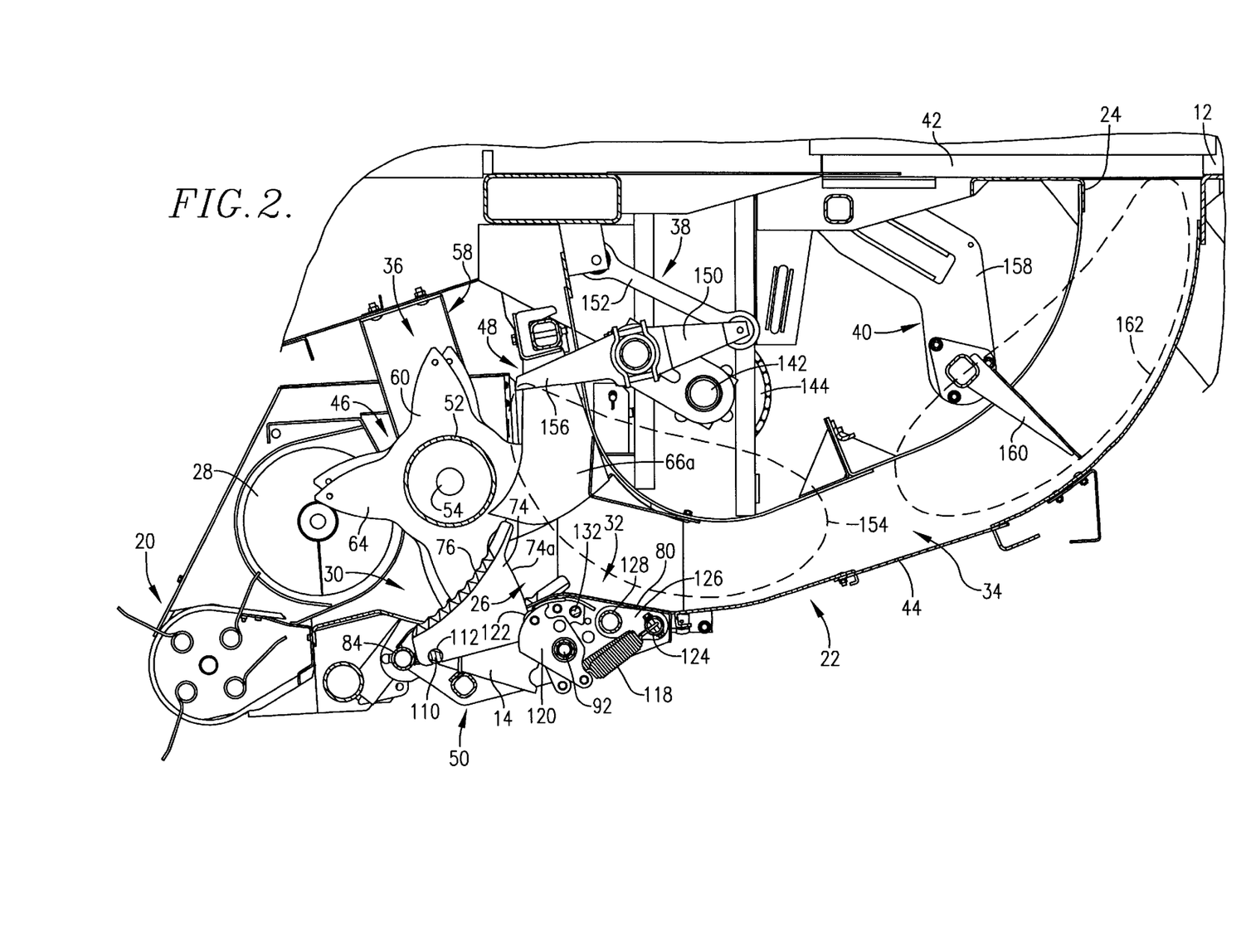
FIG. 2 is an enlarged, fragmentary, longitudinal cross-sectional view through the infeed part of the baler illustrating the relationship between the pickup, cutter apparatus, packer and stuffer.

With primary reference to FIG. 2, it will be seen that the infeed area of the baler generally comprises a passage broadly denoted by the numeral 26 for crop flow that begins just rearwardly of the pickup 20 and ends at the opening 24 in the bottom of the baling chamber 12. Although the crop materials are initially lifted off the ground by the pickup 20 in a relatively wider configuration than the width of the duct 22, such materials are immediately consolidated centrally by auger mechanism 28 before entering the passage 26. As the consolidated stream of crop materials moves rearwardly from the auger mechanism 28, it passes through a cutting zone 30 immediately behind pickup 20, then a packing zone 32 behind cutting zone 30, and finally an accumulating zone 34. Within the zone 30, the crop materials are cut into smaller pieces, within the packing zone 32 the materials have a packing and feeding force applied to them in the downstream direction of flow, and within the accumulating zone the materials accumulate into a charge that is compressed by the packing force and that assumes the configuration of the duct 22 in that area.

In order to carry out the cutting function within the cutting zone 30, the baler includes cutter apparatus broadly denoted by the numeral 36. The packing function within the packing zone 32 is carried out by packer mechanism 38. After the charge has accumulated and been properly formed within the accumulating zone 34, a stuffer 40, operating through successive stuffing cycles, sweeps the charge up into the baling chamber 12 through the opening 24. It will be recognized that a plunger 42 reciprocates within the chamber 12 (either continuously or intermittently, although continuously is preferred) through compaction and retraction strokes. Although FIG. 2 shows the plunger 42 as covering the opening 24, when the plunger 42 is fully retracted it uncovers opening 24 and allows room for the stuffer 40 to lift the prepared charge up into the empty space between the retracted plunger and the previously compacted mass of crop materials in chamber 12. Although the stuffer 40 usually operates non-stop in successive stuffing cycles, it is preferably provided with a control including a sensor plate 44 in the bottom wall of the duct 22 that causes the stuffer 40 to dwell after the completion of a stuffing stroke if the charge accumulating within zone 34 has not yet reached the desired density by the time stuffer 40 is ready to begin the next stuffing cycle.

Figure 7:
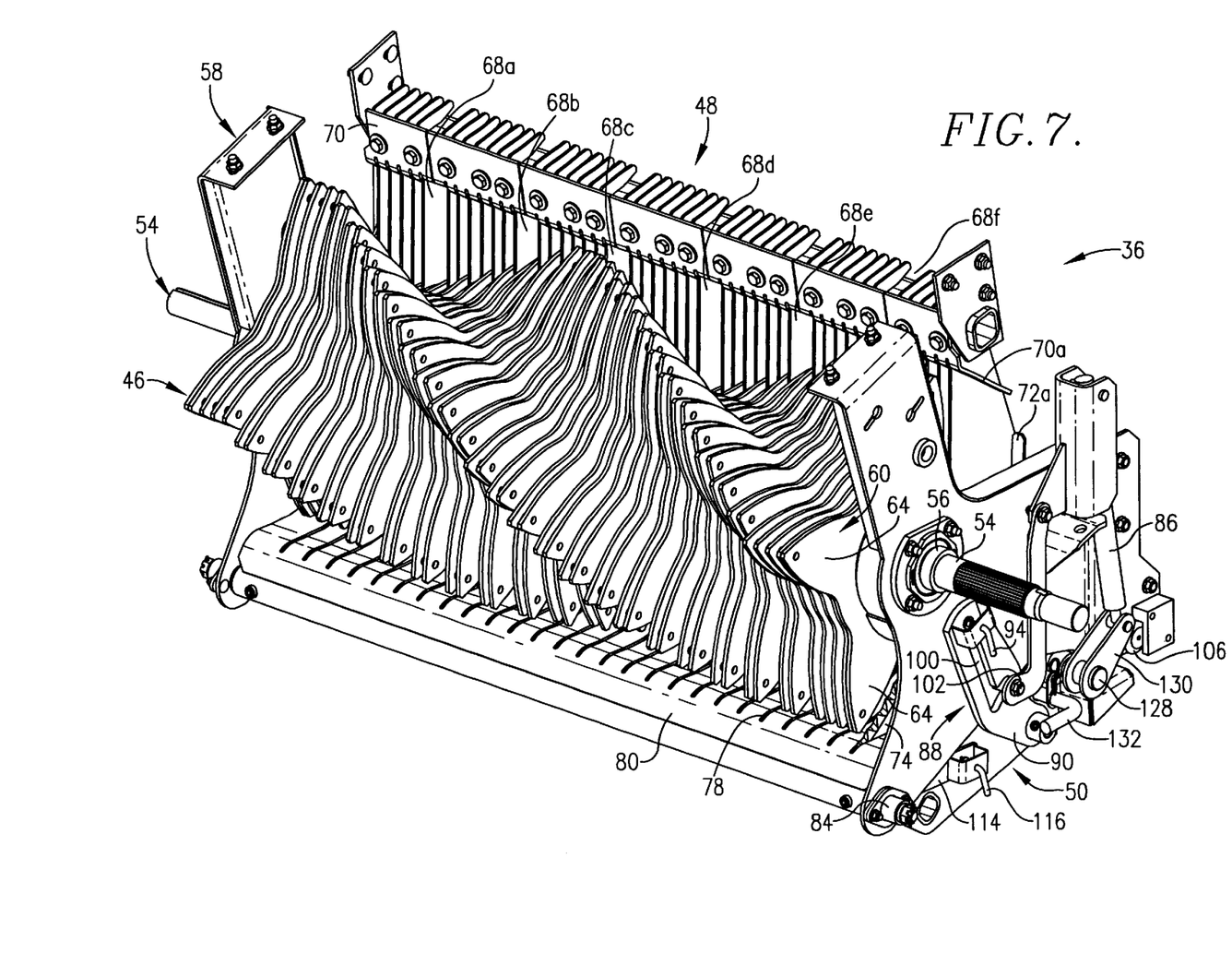
FIG. 7 is a left, front isometric view of the cutter apparatus.
Figure 8:
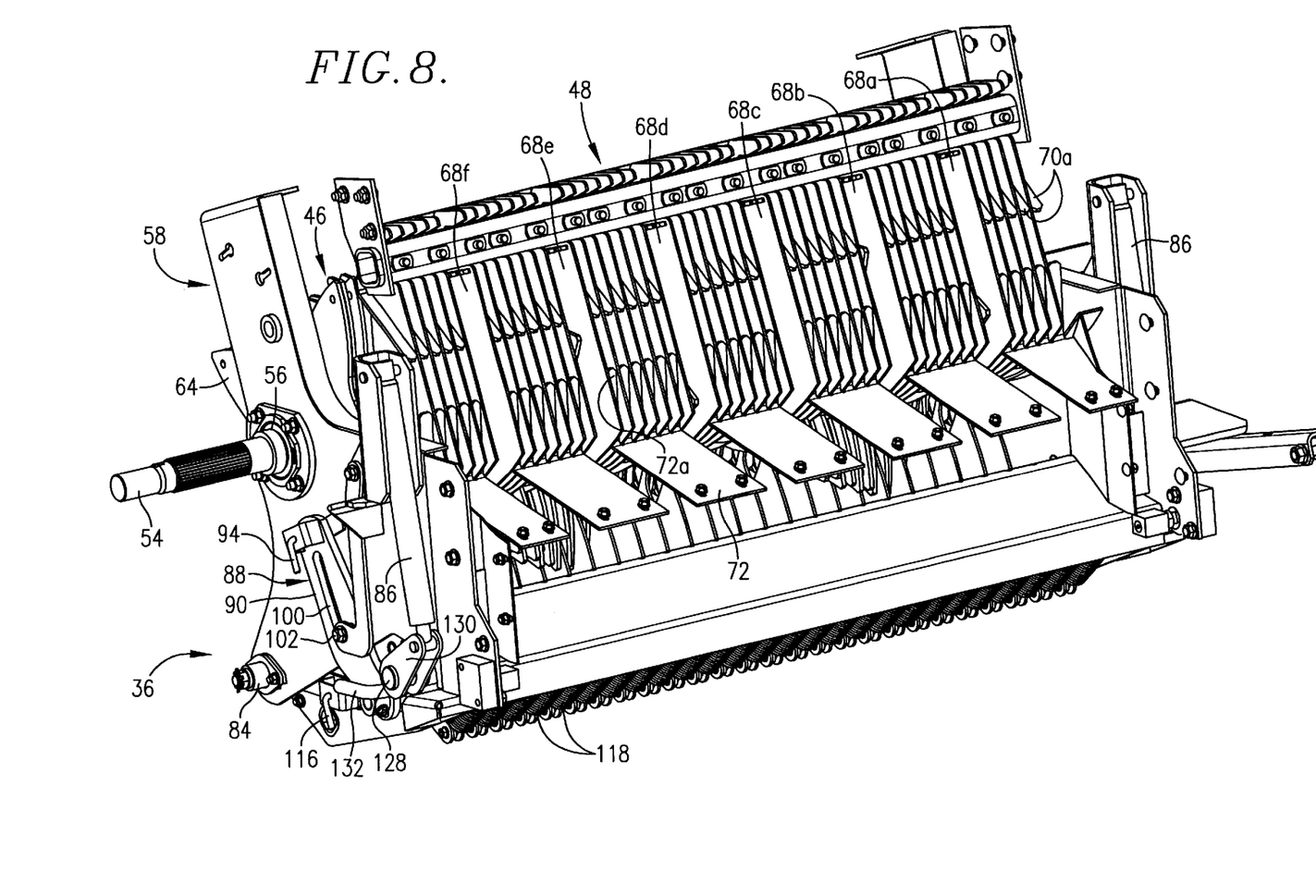
FIG. 8 is a left, rear isometric view of the cutter apparatus.

The cutter apparatus 36 comprises three primary components, i.e., a cutter rotor 46, a bank of strippers 48 for the rotor 46, and a knife bed 50 cooperating with the rotor 46 to sever the crop materials into smaller pieces. In addition to FIGS. 2 and 3, reference may be had to FIGS. 7, 8 and 9 for details of constructions of the cutter apparatus. The rotor 46 comprises a central cylindrical hub 52 having a pair of stub shafts 54 projecting from opposite ends thereof and journaled by bearings 56 mounted on a support frame 58 that is in turn suitably secured to the main chassis of the baler. A series of generally star-shaped blades 60 are affixed to the hub 52 along the length thereof for rotation with the hub 52 and the stub shafts 54 about the longitudinal axis of the stub shafts 54. Generally speaking, the blades 60 are equally spaced apart along -the length of the hub 52 except that, as shown particularly in FIG. 9, at six locations along the length of the hub 52 adjacent blades are spaced apart by an extra amount to allow clearance for prongs of the packer forks as will hereinafter be described. These six extra wide gaps are identified by the numerals 62*a*, 62*b*, 62*c*, 62*d*, 62*e* and 62*f* in FIG. 9. Furthermore, the two endmost blades 60 at opposite ends of the rotor are closely adjacent one another without any significant gap there between. Each blade 60 has four points 64 located at 90° intervals, and the blades are arranged in pairs with the points of each pair being in registration with one another. However, adjacent pairs are slightly offset rotatably from one another so that the points present a slow spiral pattern along the length of the rotor as shown particularly in FIG. 7. At opposite ends of the rotor, instead of two blades being aligned with one another, a total of five blades are disposed with their points in mutual registration with one another, including the two endmost blades at each end which are in close side-by-side relationship as previously described. Rotor 46 is driven in a counterclockwise direction viewing FIG. 2 during operation such that the blades 60 sweep downwardly into the cutting zone 30 on the front side of the axis of rotation of the rotor, sweep rearwardly through the cutting zone 30 below the axis of rotation of the rotor, and swing upwardly and rearwardly out of the cutting zone 30 behind the axis of rotation of the rotor.

The bank of strippers 48 comprises a series of generally upright stripping plates arranged on edge with respect to the direction of crop flow through the passage 26. Two differently shaped stripping plates 66*a* and 66*b* are contained within the bank of strippers 48, one of the short stripper plates 66*a* being illustrated in FIG. 2, and one of the long stripper plates 66*b* being illustrated in FIG. 3. The short stripper plates 66*a* are located between the blades 60 of each matched pair of blades, while the long stripper plates 66*b* are located between adjacent pairs of the blades 60. It will be noted that the short plates 66*a* project down only to the level of the lower periphery of the hub 52, while the long stripper plates 66*b* extend forwardly beyond the termination point of plates 66*a* and curl slightly under hub 52 in intimate but not touching relationship therewith. Stripper plates 66*a* and 66*b* are arranged in seven groups across the width of the passage 30 and along the length of the rotor 46. Although the plates within each group are equally spaced apart, each group is spaced from the next adjacent group by a larger gap to provide clearance for prongs of the packer as described below. These gaps are designated by the numerals 68*a*, 68*b*, 68*c*, 68*d*, 68*e* and 68*f* and are also seen clearly in the rear isometric view of FIG. 8. Stripper gaps 68*a*–68*f* are aligned fore-and-aft with corresponding blade gaps 62*a*–68*f*.

It will be appreciated that, within the cutting zone 30, the passage 26 is defined at the top by the lower periphery of the hub 52 and the lower edges of the stripper plates 66, at the bottom by the knife bed 50, and at the two sides by opposite side panels of the frame 58 for rotor 46. Seven upper spacers 70 are attached to the bank of strippers 48 across their upper front extremities and include a plurality of downwardly projecting spacer tangs 70*a* (see FIGS. 3 and 8) that fit between adjacent stripper plates 66 to maintain separation between the plates at that location. Similarly, seven lower spacers 72 attached to the inside surface of the top wall of the duct 22 have tangs 72*a* (FIGS. 3 and 8) that project between adjacent stripper plates 66 at their lower rear extremities to maintain separation between the strippers at that location.

Figures 3, 4:
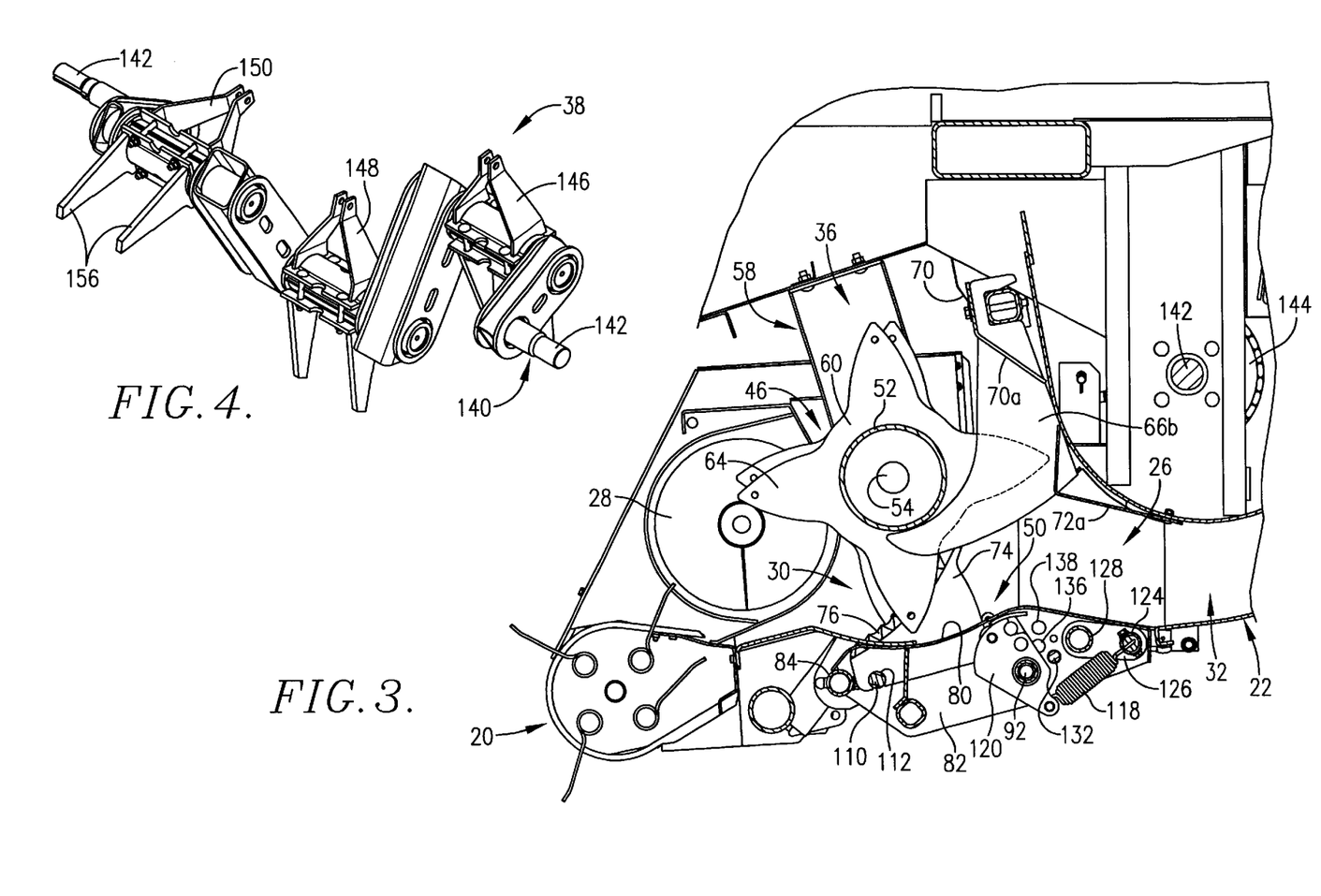
FIG. 3 is fragmentary longitudinal cross-sectional view similar to FIG. 2 but taken somewhat deeper into the baler to illustrate the relationship between the cutter rotor and strippers associated with the rotor.
FIG. 4 is an isometric view of the primary components of the packer.
Figure 9:
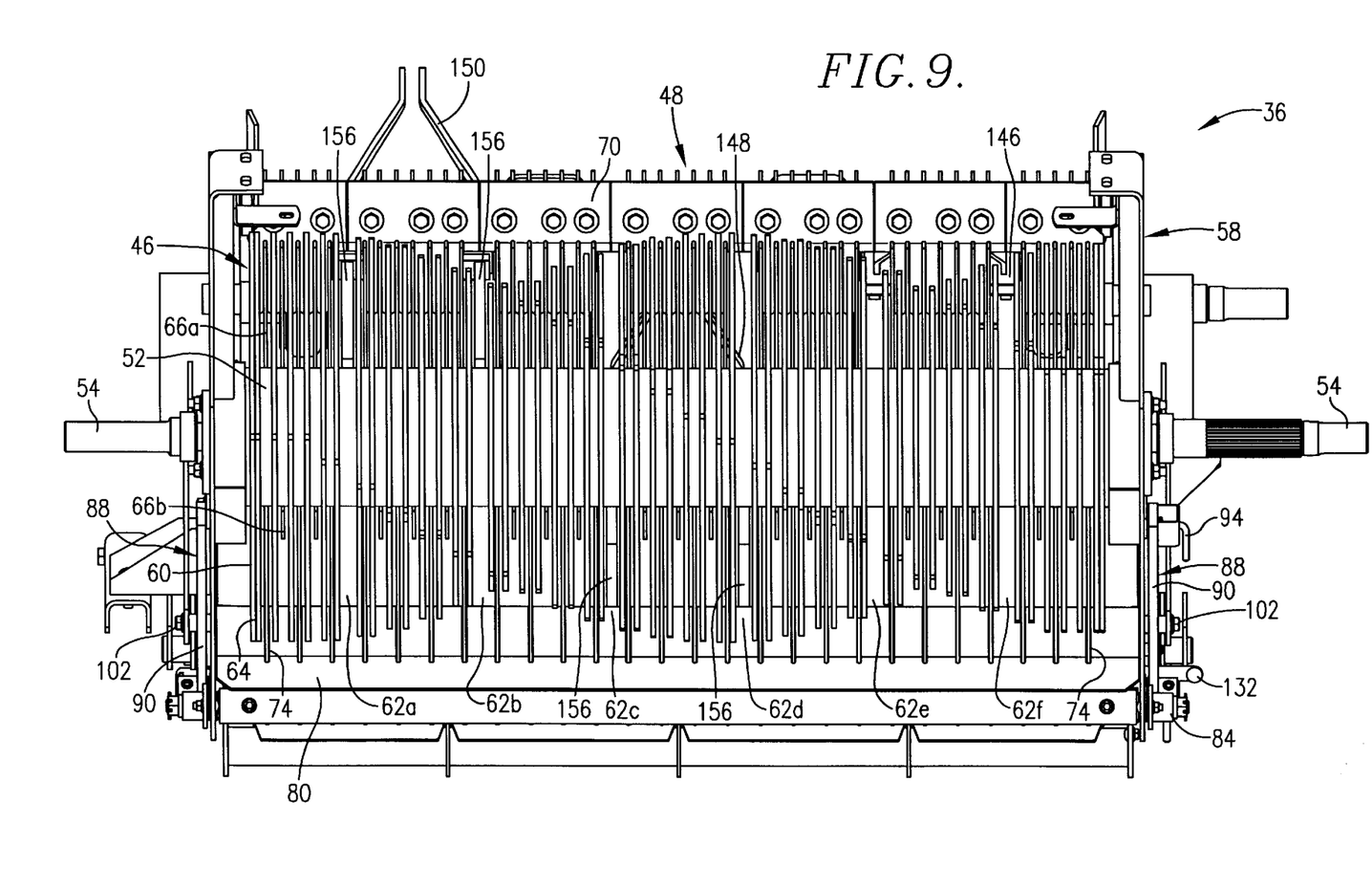
FIG. 9 is a front elevational view of the cutter apparatus.

The knife bed 50 includes a series of knives 74 that cooperate with the points 64 of blades 60 to reduce incoming crop materials into small pieces when knives 74 are in their raised, operating positions as illustrated, for example, in FIGS. 3 and 9. Knives 74 are arranged to project up between the blades 60 of each pair of blades so that as the points 64 on a pair of blades sweep downwardly and then rearwardly through the cutting zone 30 they pass on opposite sides of a corresponding knife 74. As noted in FIG. 3, each of the knives 74 has a serrated cutting edge 76 that faces generally upwardly and forwardly when the knife is in its operating position of FIGS. 3 and 9. Knives 74 project up through slits 78 (FIG. 7) in a top wall 80 of the bed when knives 74 are in their operating positions.

Figure 5:
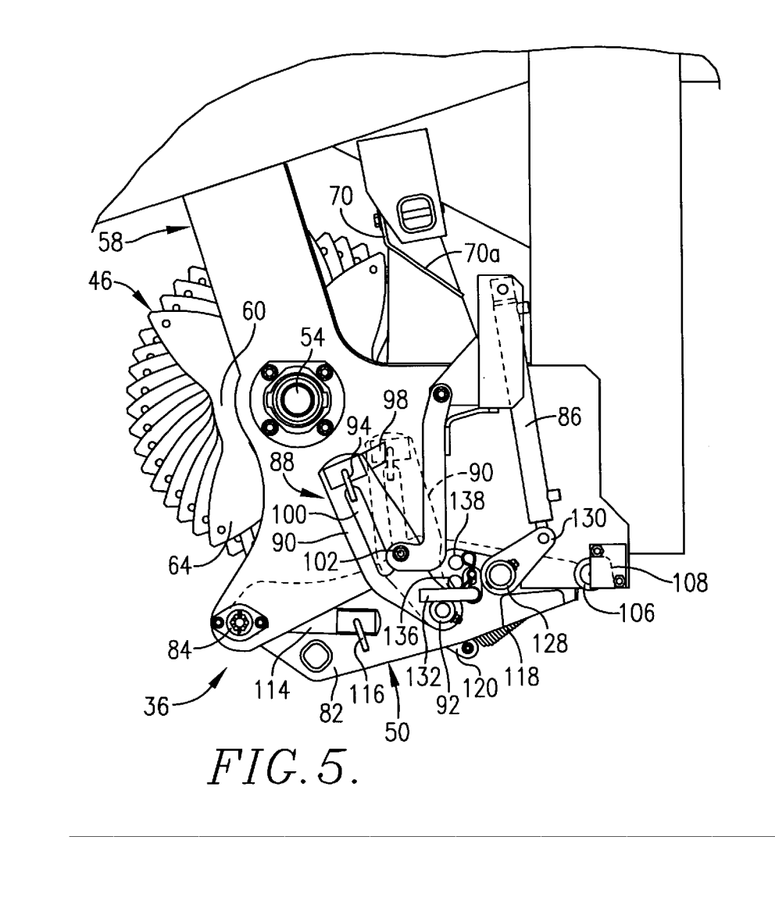
FIG. 5 is a fragmentary side elevational view of the infeed area of the baler illustrating the latching and release mechanism for the knife bed associated with the cutter apparatus.

The knives 74 are carried by a subframe 82 forming another part of the bed 50. Subframe 82 is connected to the supporting frame 58 for the rotor 46 adjacent the lower forwardmost extremity of frame 58 by a transverse pivot shaft 84 so that the entire knife bed 50 can be raised and lowered between the two extreme positions illustrated in FIGS. 5 and 6. A pair of hydraulic cylinders 86 on opposite sides of the baler control raising and lowering of the bed 50. A latch assembly 88 on each side of the baler either retains the knife bed up in its raised position of FIG. 5 or allows it to be lowered to the access position of FIG. 6 depending upon whether the assembly 88 is locked or released.

Figure 6:
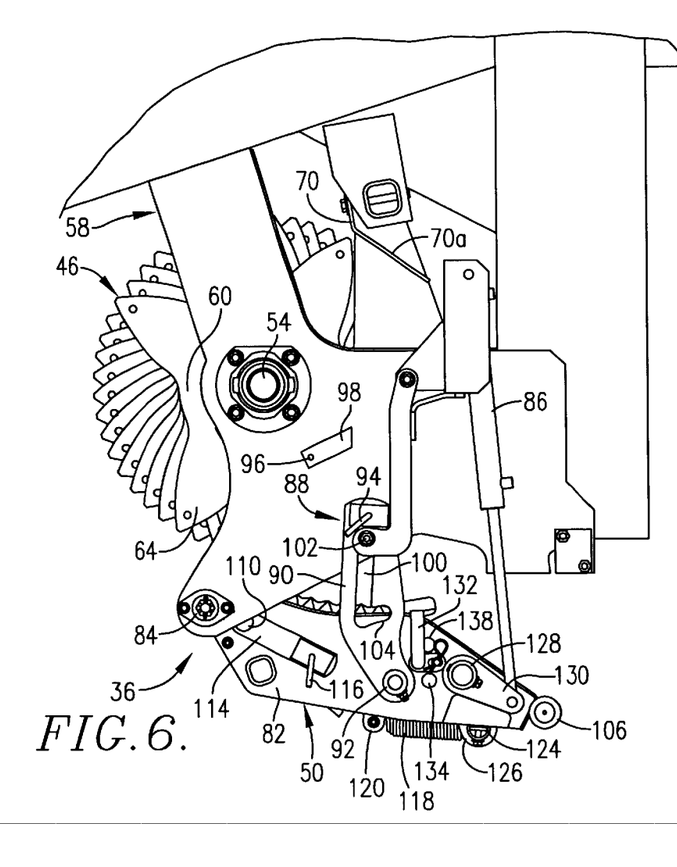
FIG. 6 is a fragmentary side elevational view similar to FIG. 5 but showing the knife bed in its fully lowered position.

In relevant part, the latch assembly 88 includes a pair of upstanding arms 90 on opposite sides of the machine that are fixed to opposite ends of a transverse shaft 92 rotatably supported by the subframe 82 and extending across the entire width of the bed 50. Arms 90 may be manually swung between the locked position in solid lines in Fig. 5 and the unlocked position in phantom lines in that same figure. A locking pin 94 in the upper end of the latch arm 90 may be inserted into a mating hole 96 (FIG. 6) in the frame 58 to lock the arm 90 in its locked position, or may be disposed adjacent and in abutting relationship with a shoulder 98 on frame 58 when arm 90 are in its phantom line released position so as to releasably hold the arm 90 against return to its unlocked position. When arm 90 is in its phantom line, unlocked position of FIG. 5, a generally upright slot 100 in arm 90 becomes aligned with a fixed guide pin 102 projecting outwardly from the frame 58, thus allowing the cylinder 86 to extend and cause the guide pin 102 to move toward the upper end of slot 100 as knife bed 50 lowers. As seen in FIG. 6, slot 100 has an inturned notch 104 at its lower end within which the guide pin 102 is received when bed 50 is fully raised and arm 90 is in its locked position. When bed 50 is fully raised and locked, a guide roller 106 on each side of bed 50 at the rear end thereof is received within a pocket 108 (FIG. 5) on the side of the frame 58 to maintain proper alignment of the bed 50 with the rotor 36.

The knives 74 are all mounted at their forward ends onto a common cross shaft 110 that extends the full width of bed 50. A generally circular notch 112 in the lower edge of each knife 74 receives the cross shaft 110. Cross shaft 110 has a pair of opposed flat sides which enable each individual knife 74 to be removed from cross shaft 110 when cross shaft 110 is rotated to a position aligning the flat sides thereof with the entrance into the notch 112 of the knife. At other times, the cross shaft 110 is maintained in such a rotative position that the flat sides thereof are generally transverse to the entrance to the notch 112 of each knife so that the knives cannot be removed from cross shaft 110. A handle 114 (FIGS. 5 and 6) fixed to one end of the cross shaft 110 may be manually operated to place the cross shaft 110 in the proper rotative position for either retaining or releasing the knives 74 therefrom. Suitable locking means such as a latching pin 116 may be associated with the handle 114 for use in selectively retaining the handle in knife-release or knife-retaining positions. As seen in FIG. 6, access to the knives 74 for removing and replacing the same is provided when the bed 50 is in its lowered position.

The knives 74 are all individually spring-loaded by a series of coiled extension springs 118 at the back of the knife bed 50. Thus, if a particular knife 74 is raised up into an operating position within the cutting zone 30 as illustrated in FIGS. 2 and 3, the knife can swing down about the cross shaft 110 against the force of its spring 118 in the event that an obstruction or solid object passes through the cutting zone 30 and engages the knife. Springs 118 do not directly connect to the knives 74, however. Instead, such connection is made through corresponding generally sector-shaped actuators 120 mounted pivotally on the common shaft 92 associated with the latch assembly 88. Each actuator 120 is free to pivot independently of the others on the shaft 92 and has a cam follower 122 on its arcuate front extremity that rides against the trailing edge 74a of the corresponding knife 74. The contour of the training knife edge 74a and its geometrical relationship to the pivot axis of the knives at shaft 110 and the pivot axis of the actuators 120 at shaft 92 are such that when a knife 74 is pushed downwardly from its raised position by an obstruction or the like, the corresponding actuator 120 is rotated in a clockwise direction viewing FIGS. 2 and 3, thus stretching the spring 118. On the other hand, when a knife 74 is in a lowered, retracted position (such as illustrated in FIG. 6) and the corresponding actuator 120 is in its clockwise-most position, rotation of the corresponding actuator 120 counterclockwise has the effect of forcibly camming the corresponding knife up into its operating position. Thus, depending upon the position for each actuator 120, the corresponding knife 74 may either be raised or lowered.

The springs 118 are anchored at one end to the lower ends of the actuators 120. At their other ends, the springs 118 are secured to a common cross tube 124 (FIGS. 2 and 3) that spans the knife bed 50 and is carried at the rear ends of a pair of crank arms 126 at opposite ends of the cross tube 124. The crank arms 126 are fixed to a common torque tube 128 journaled by opposite ends of the subframe 82. Thus, when torque tube 128 is pivoted, the two crank arms 126 move in unison to raise and lower the cross tube 124 between the raised position shown in FIGS. 2 and 3 and the lowered position barely visible in FIG. 6. Such raising and lowering of the cross tube 124 changes the effective anchor point for the springs 118. When cross tube 124 is fully raised, the springs 118 yieldably bias their actuators 120 toward the fully actuated position shown by the actuator 120 in FIG. 3. However, when the cross tube 124 is lowered, the actuators 120 may rotate around to their full clockwise most positions, permitting the knives 74 to likewise retract.

Such raising and lowering of the cross tube 124 is controlled by the hydraulic cylinders 86 that raise and lower the knife bed 50, there being relatively short crank arms 130 at the outermost ends of torque tube 128 that are coupled with the lower ends of the hydraulic cylinders 86. Thus, when latch assembly 88 is in its released position and the cylinders 86 are extended to lower the knife bed 50, the initial extending movement of the cylinders 86 causes actuation of the crank arms 130 to pivot the torque tube 128, thus lowering the cross tube 124, rotating the actuators 120 to their full clockwise position, and retracting all of the knives 74. With knives 74 in their retracted positions and the tension in springs 118 substantially released, the handle 114 may be operated to properly align the flats of cross shaft 110 in the appropriate manner to allow removal of any one or all of the knives 74.

The number of knives 74 which are raised up into their operating position when the bed is in its operating position can be selectively varied. This can be carried out by controlling which of the actuators 120 are allowed to rotate back into their actuated positions by the springs 118 as the bed 50 is raised up into its operating position. In a preferred embodiment, this is accomplished by having the total set of actuators 120 constructed in four different configurations that render it possible to prevent every third actuator from returning, prevent every other actuator from returning, or prevent none of the actuators from returning. In the latter situation, all of the knives are thus raised back up to their operating position.

For carrying out such selection of the actuators, knife bed 50 includes a selector rod 132 having a length slightly greater than the width of the knife bed 50. When bed 50 is in its lowered position of FIG. 6, and all of the knives 74 are in their retracted positions, all of the actuators 120 are also in their clockwise-most positions. At that time, the selector rod 132 may be placed in any selected one of three holes 134,136, or 138 in the knife bed 50. The configuration of actuators 120 is such that each of the different types of actuators can be retained by the rod 132 against return movement to actuated positions, depending upon which of the holes 134–138 rod 132 is inserted into. Thus, if rod 132 is inserted into lower hole 134 when all of the actuators 120 are in their unactuated positions, none of the actuators will be held by rod 132 against being swung by their springs 118 back to the actuated position when cylinders 86 are retracted. Thus, all of the knives 74 will be cammed up into their operating positions. Similarly, if the middle hole 136 is selected for rod 132, every other actuator 120 will be precluded from swinging back into their actuated positions, which results in every other knife being raised back up to its operating position. If the top hole 138 is selected, every third actuator is allowed to return, resulting in every third knife raising back up to its operating position. Accordingly, the position of the rod 132 determines which grouping of knives 74 will be in position to coact with the rotor 46 when knife bed 50 is in its raised, operating position.

The packer mechanism 38 is shown in some detail in FIG. 4. As illustrated therein, packer 38 includes a crankshaft assembly 140 having oppositely projecting end stub shafts 142. As shown only in FIG. 2, a chain and sprocket drive mechanism 144 is operably coupled with one of the stub shafts 142 for causing rotation of the crankshaft assembly 140. Attached to crankshaft assembly 140 are three staggered forks 146, 148 and 150 that are several degrees out of phase with one another. Each of the forks 146–150 has its own control rod 152 (FIG. 2) connecting the upper end of the fork with overhead structural members of the baler such that, as the crankshaft assembly 140 revolves about the axis of stub shafts 142, the forks 146–150 move through generally kidney shaped paths of travel as illustrated by the phantom lines 154 in FIG. 2. Due to the offset or staggered angular relationship between the three forks, they sweep downwardly through the packing zone 32 of the passage 30 in staggered succession along their path of travel 154.

It will be seen that each of the forks includes a pair of prongs 156 that project into interleaved relationship with certain of the blade points 64 of cutter rotor 46 immediately behind the hub 52 thereof. Consequently, the forks 146–150 are sweeping downwardly through the rotor 46 on its rear side while the blade points 64 are sweeping upwardly in the opposite direction out of the cutting zone 30. As shown in FIG. 9, the prongs 156 of fork 150 slip into the gaps 62a and 62b of the cutter rotor 46, while prongs 156 of fork 148 slip into gaps 62c and 62d. Although not clearly shown in FIG. 9, the prongs 156 of fork 146 slip into gaps 62e and 62f of cutter rotor 46.

Stuffer 40 comprises a large fork 158 having a multiplicity of tines 160 across the width of the duct 22. The top wall of duct 22 is slotted to permit the entry and egress of tines 160, and also the entry and egress of the prongs 156 of packer forks 146–150. The tips of stuffer tines 160 move along the generally kidney-shaped path of travel denoted by the numeral 162 in FIG. 2. As explained above, stuffer 40 operates through successive stuffing cycles to load crop materials up into bale chamber 12, but in the event a charge has not fully formed within accumulating zone 34 by the time stuffer 40 is ready to begin its next stuffing cycle, it will dwell for at least one more cycle, as determined by the position of the sensor plate 44. Although not shown in FIG. 2, it will be understood that a set of retaining hooks or the like are positioned at the upper end of duct 22 just below opening 24 into the bale chamber 12 for the purpose of preventing any part of an accumulated charge from entering the bale chamber 12 during a dwell cycle of stuffer 40.

Operation

The mode of operation of the baler 10 should be apparent from the foregoing detailed description. Accordingly, only a brief explanation of such operation will be set forth herein.

As the baler travels across the field, pickup 20 continuously lifts crop materials from the field and presents them to the converging augers 28 which consolidate the crop centrally into a stream that corresponds substantially in width to the width of the crop passage 26. As the materials enter the front end of passage 26, they immediately pass through the cutting zone 30 where they are subjected to disintegration by the cutter rotor 46 operating in conjunction with knives 74 of cutter bed 50. Materials which might tend to carry around rotor 46 are stripped therefrom on the back side of the rotor by strippers 48, at which point they enter the packing zone 32.

Forks 146–150 of packer 38 sweep downwardly into the packing zone 32 in interleaved relationship with points of the blades of rotor 46 so as to engage the disintegrated materials immediately after they pass through rotor 46 and are leaving cutting zone 30. Such interaction of the packer forks with the cut materials subjects them to a positive rearward or downstream-directed feeding and packing force throughout the packing zone 32 as the materials enter duct 22 and are moved toward the accumulating zone 34 just beyond the reach of forks 146–150. Stuffer 40 then takes the accumulated, preshaped and precompressed charge and sweeps it up into the baling chamber.

While stuffer 40 sweeps through a stuffing stroke, a fresh supply of material from packer 38 follows along immediately behind it to fill up the accumulating zone 34. Most of the packing and compressive force, however, comes about after the leadingedge of the incoming accumulation of materials has reached a point at or near the top of the duct 22 where it becomes engaged by retaining hooks (not shown) and precluded from further travel as the stuffer withdraws from the baling chamber and starts along the backside of its path of travel. During retraction of the stuffer 40 along the backside of its path of travel 162 outside of duct 22, the accumulating materials are packed and shaped into a progressively more dense charge as the packing action continues nonstop in the packing zone 32 upstream from the leading edge of the materials.

It has been found that by utilizing the separate packer 38 and not relying upon the rotor 46 to do the feeding and packing function as well as the cutting function, significantly improved bale shape is achieved. This is important riot only in producing bales that can be properly handled immediately after formation, but also substantially later during various loading, unloading and feeding operations. Moreover, good bale shape promotes the production of nutritious, high quality hay that is better able to withstand the elements and is better for the livestock to which it is fed.

The preferred forms of the invention described above are to be used as illustration only, and should not be utilized in a limiting sense in interpreting the scope of the present invention. Obvious modifications to the exemplary embodiments, as herein above set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a baler having a fore-and-aft, generally horizontally extending baling chamber, a plunger reciprocable within said chamber in compression and retraction strokes, and an opening in the bottom of the baling chamber through which charges of crop material are introduced into the chamber between compression strokes of the plunger, the improvement comprising:

a pickup for lifting crop materials off the ground as the baler advances;

structure defining a passage from the pickup to the opening in the baling chamber and through which the crop materials travel on their way to the baling chamber, said passage including a cutting zone in which materials from the pickup are reduced into smaller pieces, a subsequent packing zone in which a packing force is applied to the reduced materials generally in the downstream direction with respect to the direction of movement of the materials through the passage, and an accumulating zone in which the materials subjected to the packing force accumulate into a charge;

cutter apparatus operable in said cutting zone to reduce the crop materials from the pickup into smaller pieces;

a packer operable in said packing zone to apply the packing force to the crop materials after they have been reduced in said cutting zone; and a stuffer operable in said accumulating zone through periodic loading cycles to load an accumulated charge up into the baling chamber.

2. In a crop baler as claimed in claim 1, said stuffer having control mechanism operably associated therewith for temporarily deactivating the stuffer in the event a charge accumulating in said accumulating zone has failed to reach a predetermined density by the start of the next loading cycle of the stuffer.

3. In a crop baler as claimed in claim 1, said cutter apparatus including a rotor having a plurality of laterally spaced, multi-pointed blades mounted for rotation about a common transverse axis, said rotor being driven in such a direction that the points of each blade sweep downwardly in front of said transverse axis, rearwardly through the cutting zone, and then upwardly behind said transverse axis.

4. In a crop baler as claimed in claim 3, said packer having prongs that pass downwardly between upwardly sweeping blades of the rotor behind said transverse axis.

5. In a crop baler as claimed in claim 4, said packer including a transverse crankshaft having a plurality of forks mounted thereon at spaced and rotatively staggered locations across the passage to interact sequentially with the rotor, each of said forks including at least one prong.

6. In a crop baler as claimed in claim 3, said cutter apparatus further including a series of upstanding knives projecting up into the cutting zone from the bottom of the cutting zone, said knives being spaced transversely across the cutting zone and interspersed between blades of the rotor.

7. In a crop baler as claimed in claim 6, said knives being retractable to a position at least substantially out of said cutting zone.

8. In a crop baler as claimed in claim 3, the blades of said rotor being progressively rotative offset from one another across the width of the cutting zone to present the points of the blades in a spiraled pattern.

9. In a crop baler as claimed in claim 3, said cutter apparatus further including a plurality of strippers arranged at spaced apart locations across the cutting zone and projecting into the spaces between the blades from behind the axis of rotation of the rotor.

10. In a crop baler as claimed in claim 9, said packer having prongs that pass downwardly between upwardly sweeping blades of the rotor behind said transverse axis.

11. In a crop baler as claimed in claim 10, said cutter apparatus further including a series of upstanding knives projecting up into the cutting zone from the bottom of the cutting zone, said knives being spaced transversely across the cutting zone and interspersed between blades of the rotor.

12. In a crop baler as claimed in claim 11, the blades of said rotor being progressively rotatively offset from one another across the width of the cutting zone to present the points of the blades in a spiraled pattern.

13. In a crop baler as claimed in claim 11, said knives being provided with mechanism operable to permit certain knives in the series to be disposed in retracted positions out of the cutting zone while others in the series are disposed in operating positions projecting into the cutting zone.

14. In a crop baler as claimed in claim 11, each of said knives being spring-loaded so as to be shiftable out of the cutting zone against spring resistance.

* * * * *